(12) United States Patent
Park et al.

(10) Patent No.: US 9,763,142 B1
(45) Date of Patent: Sep. 12, 2017

(54) WIRELESS DEVICE COMMUNICATION

(71) Applicant: Sprint Spectrum LP, Overland Park, KS (US)

(72) Inventors: Sungki Park, Ashburn, VA (US); Saied Kazeminejad, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 42 days.

(21) Appl. No.: 14/730,307

(22) Filed: Jun. 4, 2015

Related U.S. Application Data

(63) Continuation of application No. 13/679,971, filed on Nov. 16, 2012, now Pat. No. 9,084,167.

(51) Int. Cl.
| | |
|---|---|
| *H04M 1/00* | (2006.01) |
| *H04W 36/00* | (2009.01) |
| *H04W 48/18* | (2009.01) |
| *H04W 68/02* | (2009.01) |
| *H04W 88/06* | (2009.01) |

(52) U.S. Cl.
CPC ....... *H04W 36/0005* (2013.01); *H04W 48/18* (2013.01); *H04W 68/02* (2013.01); *H04W 88/06* (2013.01)

(58) Field of Classification Search
CPC .................................................... H04W 48/18
USPC ... 455/458, 435.1, 435.2, 436, 552.1, 426.1; 370/331, 242, 252, 329, 328, 389, 312
See application file for complete search history.

(56) References Cited

U.S. PATENT DOCUMENTS

| | | | |
|---|---|---|---|
| 6,879,600 B1 | 4/2005 | Jones et al. | |
| 7,200,397 B1 | 4/2007 | Jones et al. | |
| 7,277,710 B1 | 10/2007 | Jones et al. | |
| 9,345,063 B2* | 5/2016 | Jain .................. | H04W 88/06 |
| 2009/0274141 A1 | 11/2009 | Kanai | |
| 2010/0030341 A1 | 2/2010 | Dietl et al. | |
| 2011/0065430 A1* | 3/2011 | Jee .................... | H04W 68/12 |
| | | | 455/426.1 |
| 2011/0319073 A1 | 12/2011 | Ekici et al. | |
| 2012/0064884 A1* | 3/2012 | Ramachandran . | H04W 36/0022 |
| | | | 455/422.1 |
| 2012/0142356 A1 | 6/2012 | Serravalle et al. | |
| 2012/0218889 A1* | 8/2012 | Watfa ............... | H04W 60/04 |
| | | | 370/230 |

(Continued)

FOREIGN PATENT DOCUMENTS

WO 2012050842 A1 4/2012

OTHER PUBLICATIONS

European Office Action for Application No. 13 798 846.5, dated Aug. 3, 2016.

*Primary Examiner* — Kiet Doan

(57) ABSTRACT

An indication is received from a wireless device in communication with a first communication system using a first radio access technology that the wireless device has detected a second communication system using a second access technology. Network information of the first communication system is provided and stored at the wireless device when performing a first handover of the wireless device from the first communication system to the second communication system. The network information is provided to the first communication system to perform a second handover from the second communication system to the first communication system.

2 Claims, 5 Drawing Sheets

(56) References Cited

U.S. PATENT DOCUMENTS

2012/0225658 A1 9/2012 Oostveen et al.
2013/0089039 A1* 4/2013 Vashi .................. H04W 72/02
370/329

* cited by examiner

WIRELESS DEVICE COMMUNICATION

This patent application is a continuation of, and claims priority to, U.S. application Ser. No. 13/679,971, filed on Nov. 16, 2012, the entire contents of which is incorporated by reference herein.

TECHNICAL BACKGROUND

Wireless communication networks implement various methods of maintaining a communication link with a wireless device as the wireless device moves geographically. For example, a handover of a wireless device may be performed from a first access node to a second access node. The handover may be performed for many reasons. For example, the wireless device may move from a coverage area of one access node to a coverage area of another access node. A handover of a wireless device can also be performed for purposes of load balancing, carrier band use management, to address network congestion, or some other reason. Typically, when performing a handover from one access node to another access node, the communication network provides to the target access node network information, such as context information, comprising information about the wireless device and the communication session.

OVERVIEW

In an embodiment, an indication is received from a wireless device in communication with a first communication system using a first radio access technology that the wireless device has detected a second communication system using a second access technology. Network information of the first communication system is provided, and the network information is stored at the wireless device when performing a first handover of the wireless device from the first communication system to the second communication system. In an embodiment, the network information is provided to the first communication system to perform a second handover from the second communication system to the first communication system.

DETAILED DESCRIPTION

Figure 1:
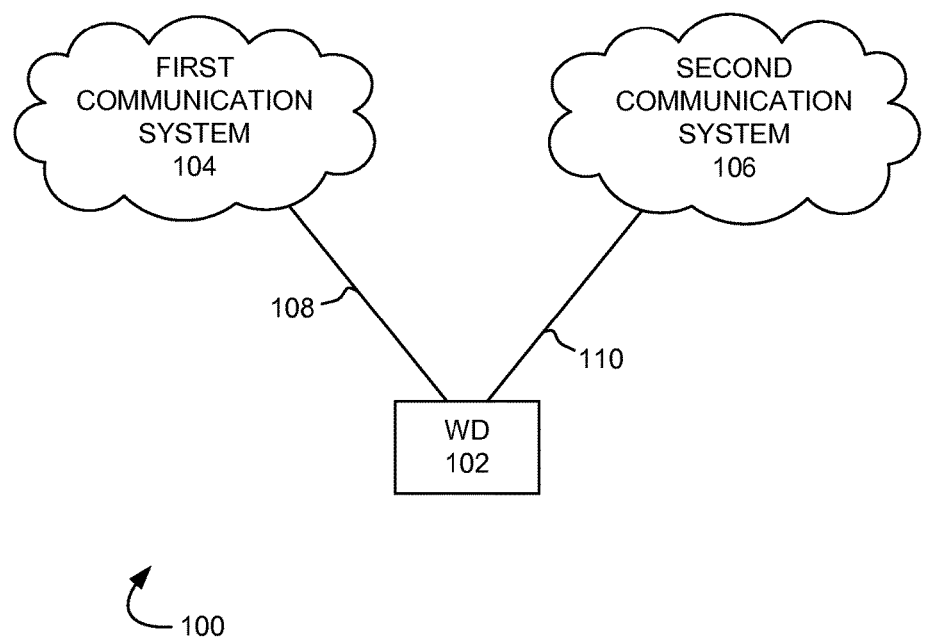
FIG. 1 illustrates an exemplary communication system for communicating with a wireless device.

FIG. 1 illustrates an exemplary communication system 100 for communicating with a wireless device comprising wireless device 102, first communication system 104 and second communication system 106. Examples of wireless device 102 can include a cell phone, a smart phone, a computing platform such as a laptop, palmtop, or tablet, a personal digital assistant, or an internet access device, including combinations thereof. Wireless device 102 can communicate with first communication system 104 over communication link 108, and with second communication system 106 over communication link 110.

Communication system 104, 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication system 104, 106 may also comprise base stations, wireless communication nodes, telephony switches, routers, gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication system 104, 106 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 108 and 110 can be wired or wireless communication links. Wired communication links can be, for example, twisted pair cable, coaxial cable or fiber optic cable, or combinations thereof. Wireless communication links can be a radio frequency, microwave, infrared, or other similar signal. Wireless communication links can also use a suitable communication protocol, for example, Global System for Mobile telecommunications (GSM), Code Division Multiple Access (CDMA), Worldwide Interoperability for Microwave Access (WiMAX), or Long Term Evolution (LTE), as well as short range wireless protocols such as, for example, protocols from the IEEE 802 family including, for example, WiFi, WLAN, Bluetooth, Zigbee, IrDA and the like, and combinations thereof.

Other network elements may be present in communication system 100 to facilitate wireless communication but are omitted for clarity, such as base stations, base station controllers, gateways, mobile switching centers, dispatch application processors, mobility management entities, and location registers such as a home location register or visitor location register, as well as additional processing nodes, routers, gateways, and physical and/or wireless data links for carrying data among the various network elements.

First communication system 104 can be in communication with wireless device 102, and can determine to perform a handover of wireless device 102 to second communication system 106. Wireless device 102 can detect the presence of second communication system 106, and can report the presence of second communication system 106 to first communication system 104. For example, first communication system can use a protocol such as LTE, WiMAX, and the like, to communicate with wireless device 102. Further, wireless device 102 can detect the presence of an access node of second communication system 106, which can communicate with wireless device 102 using a protocol such as WiFi, Bluetooth, Zigbee, IrDA, and the like. In an embodiment, wireless device 102 can detect the presence of second communication system 106, and report the presence of second communication system 106 to first communication system 104.

Communication system 104 can determine to perform a handover of wireless device 102 to communication system 106. For example, communication system 104 may determine to perform a handover of wireless device 102 to communication system 106 to perform load balancing, or to reduce congestion in communication system 104, or to reduce roaming costs, usage costs, or other costs to wireless device 102, or because wireless device 102 may leave a coverage area of communication system 312. Other purposes for performing a handover of wireless device 102 are also possible. Prior to performing the handover to communication system 106, network information can be stored on wireless device 102. Network information can comprise information about the identity of the wireless device, its mobility state, and parameters related to the communication session between communication system 104 and wireless device 102. When a second handover is performed to hand over wireless device 102 from communication system 106 back to communication system 104, wireless device 102 can provide the stored network information to communication system 104 to facilitate the handover and establishment of a communication link with communication system 104. If the network information were not readily available from wireless device 102, delay can be caused in establishing the communication link and creating a communication session with communication system 104. For example, first communication system may be required to retrieve network and related information from elsewhere in communication system 104.

In an embodiment, a network element of communication system 104 receives an indication from wireless device 102, which is in communication with first communication system 104 using a first radio access technology, that wireless device 102 has detected a second communication system 106 using a second access technology. The network element of communication system 104 provides network information of first communication system 104 to be stored at wireless device 102 when performing a first handover of wireless device 102 from first communication system 104 to second communication system 106.

Figure 2:
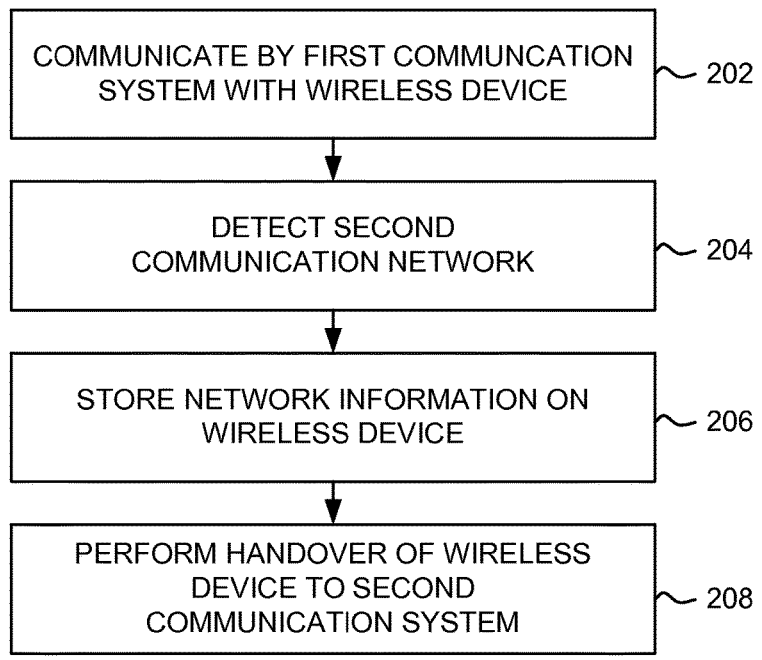
FIG. 2 illustrates an exemplary method of communicating with a wireless device.

FIG. 2 illustrates an exemplary method of communicating with a wireless device. In operation 202, a first communication system communicates with a wireless device. For example, first communication system 104 can communicate with wireless device 102 over communication link 108. First communication system 104 can use a protocol such as LTE, WiMAX, and the like to communicate with wireless device 102.

In operation 204, a network element of the first communication system receives an indication from the wireless device that the wireless device has detected a second communication system. For example, a network element of first communication system 104 can receive from wireless device 102 an indication that wireless device 102 has detected second communication system 106. The received indication can comprise, for example, an indication that an access node of second communication system 106 has been detected, and can further provide an indication of a wireless protocol used by the access node of the second communication system. In an embodiment, second communication system 106 can use a protocol such as WiFi, WLAN, Bluetooth, Zigbee, IrDA and the like.

In operation 206, network information is stored on the wireless device. For example, network information related to a communication session between first communication session 104 and wireless device 102 can be stored on wireless device 102. The network information can comprise context information, for example, comprising information about the wireless device and the communication session. In an embodiment, a communication session controller such as, for example, a mobility management entity or similar network element, can provide the network information.

In operation 208, a handover is performed to hand over the wireless device from the first communication system to the second communication system. For example, wireless device 102 can be handed over from first communication system 104 to second communication system 106. For example, to address network congestion, load balancing, or carrier band management, when wireless device 102 detects second communication system 106, wireless device 102 may notify first communication system 104 by sending a message to first communication system 104. First communication system 104 may provide network information to wireless device 102 and can perform a handover of wireless device 102 to second communication system 106.

Figure 3:
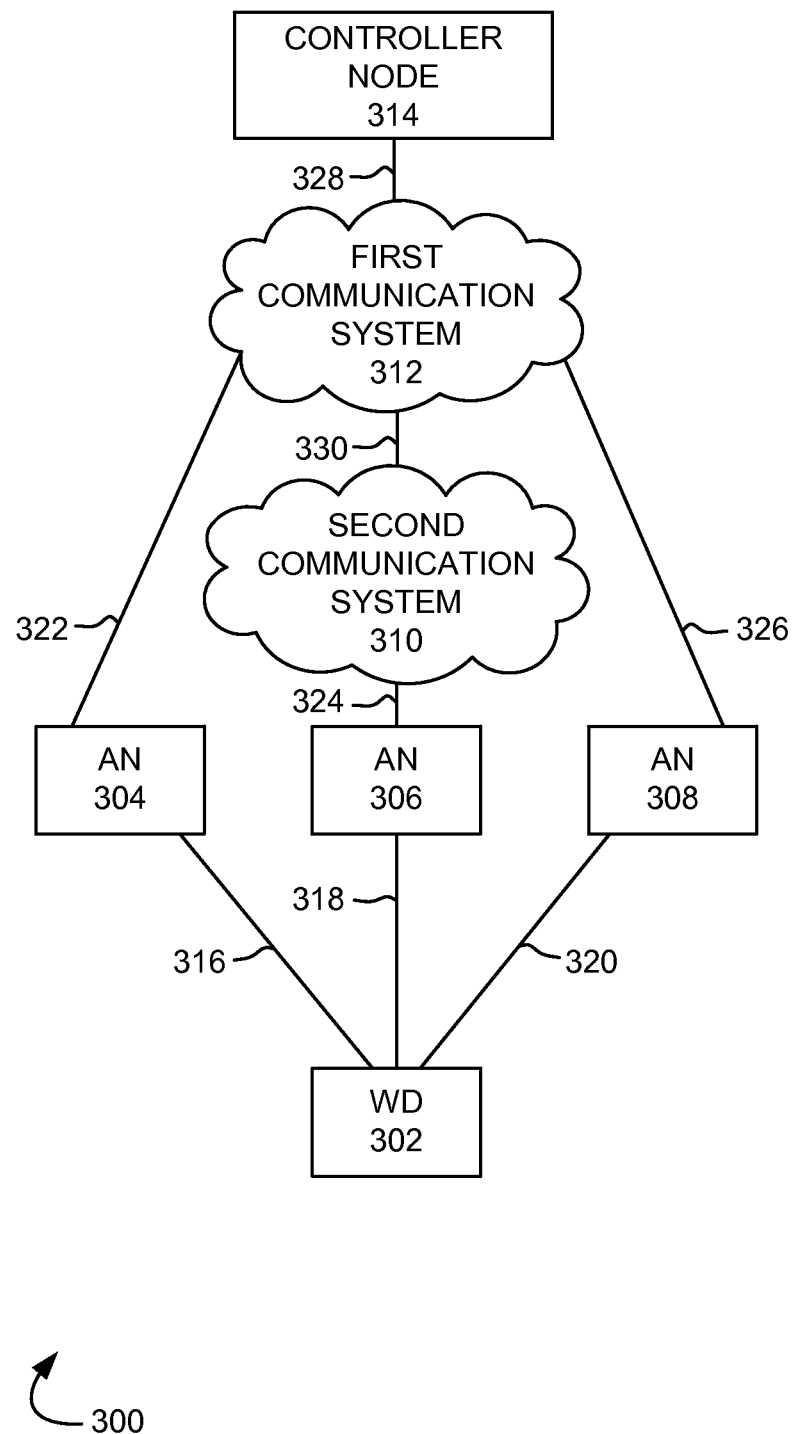
FIG. 3 illustrates another exemplary communication system for communicating with a wireless device.

FIG. 3 illustrates another exemplary communication system 300 for communicating with a wireless device comprising wireless device 302, access nodes 304, 306 and 308, first communication system 312, second communication system 310, and controller node 314. Examples of wireless device 302 can include a cell phone, a smart phone, a computing platform such as a laptop, palmtop, or tablet, a personal digital assistant, or an internet access device, including combinations thereof. Wireless device 302 can communicate with access node 304 over communication link 316, with access node 306 over communication link 318, and with access node 308 over communication link 320.

Access node 304, 306, and 308 are network nodes capable of providing wireless communications to wireless device 102. Examples of access nodes 304 and 308 can be, for example, a base transceiver station, a radio base station, an eNodeB device, or an enhanced eNodeB device. Access node 304 is in communication with first communication system 312 through communication link 316, and access node 308 is in communication with first communication system 312 through communication link 326. Examples of access node 306 can be, for example, a WiFi node, a WLAN node, a Bluetooth node, a Zigbee node, an IrDA node, and the like. Access node 306 is in communication with second communication system 310 over communication link 324. Although three access nodes 304, 306 and 308 are illustrated in FIG. 3 for clarity, each of first communication system 312 and communication system 310 can communicate with a plurality of access nodes, each of which can be capable of communication with wireless device 302.

Communication system 310, 312 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication system 310, 312 may also comprise base stations, wireless communication nodes, telephony switches, routers, gateways, computer systems, communication links, or some other type of communication equipment, and combinations thereof. Wireless network protocols may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication system 310, 312 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication systems 310 and 312 can communicate over communication link 330.

Controller node 314 is a network element in communication with communication system 312 over communication link 328. Controller node 314 can comprise a processor and associated circuitry to execute or direct the execution of computer-readable instructions to communicate with wireless device 302. Controller node 314 can retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 314 can receive instructions and other input at a user interface. Examples of controller node 314 can include a standalone computing device, such as a mobility management entity (MME); additionally or alternatively, the functionality of controller node 314 can be incorporated into another network element.

Communication links 316, 318, 320, 322, 324, 326, 328 and 330 can be wired or wireless communication links. Wired communication links can be, for example, twisted pair cable, coaxial cable or fiber optic cable, or combinations thereof. Wireless communication links can be a radio frequency, microwave, infrared, or other similar signal. Wireless communication links can also use a suitable communication protocol, for example, Global System for Mobile telecommunications (GSM), Code Division Multiple Access (CDMA), Worldwide Interoperability for Microwave Access (WiMAX), or Long Term Evolution (LTE), as well as short range wireless protocols such as, for example, protocols from the IEEE 802 family including, for example, WiFi, WLAN, Bluetooth, Zigbee, IrDA and the like, and combinations thereof.

Other network elements may be present in the communication system 300 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication between access nodes 304, 306 and 308, first communication system 312, second communication system 310 and controller node 314 which are omitted for clarity, including additional processing nodes, routers, gateways, and physical and/or wireless data links for carrying data among the various network elements.

Figure 4:
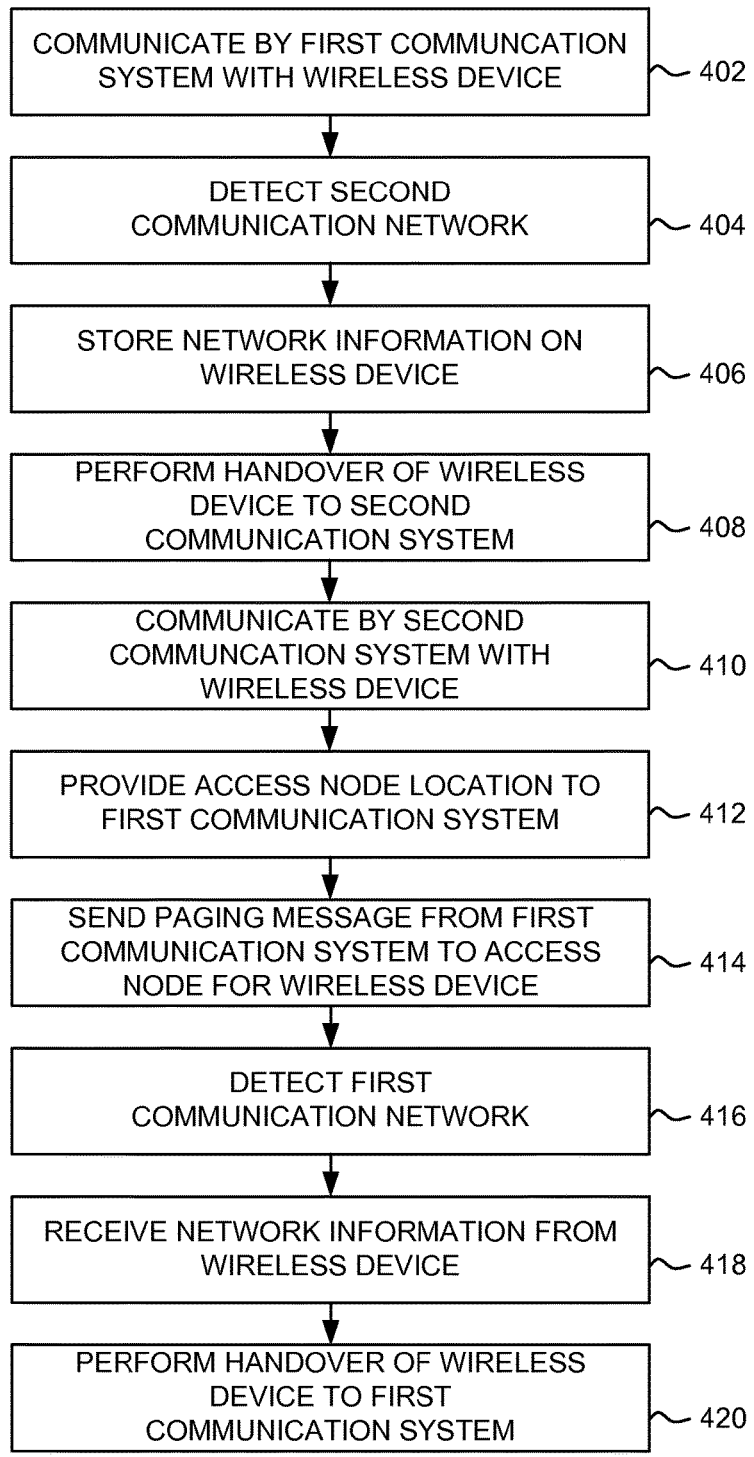
FIG. 4 illustrates another exemplary method of communicating with a wireless device.

FIG. 4 illustrates another exemplary method of communicating with a wireless device. In operation 402, a first communication system communicates with a wireless device. For example, first communication system 312 can communicate with wireless device 302 through access node 304. In an embodiment, first communication system 312 can communicate with wireless device 302 through access node 304 using a protocol such as LTE, WiMAX, CDMA, and the like.

In operation 404, a network element of the first communication system receives an indication from the wireless device that the wireless device has detected a second communication system. For example, a network element of first communication system 312 can receive from wireless device 302 an indication that wireless device 302 has detected second communication system 310. The received indication can comprise, for example, an indication that an access node of second communication system 106 has been detected, and can further provide an indication of a wireless protocol used by the access node of the second communication system. For example, first communication system 312 can receive an indication that wireless device 302 has detected access node 306. In an embodiment, second communication system 310 can use a protocol such as WiFi, WLAN, Bluetooth, Zigbee, IrDA and the like.

In operation 406, network information is stored on the wireless device. For example, network information related to a communication session between first communication system 312 and wireless device 302 can be stored on wireless device 302. In an embodiment, a communication session controller such as, for example, a mobility management entity or similar network element, can provide the network information. The network information can comprise context information. The network information can comprise, for example, a network profile and/or network access history associated with wireless device 302, information related to access nodes with which wireless device 302 has been in communication (such as access node 304), user settings and/or user profile information related to wireless device 302, settings and requirements of applications running on wireless device 302, network load or network status information, and the like.

In a case where a handover is performed of a wireless device to a new access node and network information is not available at the new access node, the network information typically is retrieved from another network element. For example, network information related to a wireless device can be retrieved from a network element such as controller node 314. Retrieving network information from another network element introduces delay into the handover process, and can cause delay in the delivery of data and/or degradation of the performance of applications running on the wireless device. By storing the network information on the wireless device, the network information can be readily available from the wireless device when performing a handover of the wireless device. In addition, different communication systems, such as first communication system 312 and second communication system 310, may not exchange the network information.

In operation 408, a handover is performed to hand over the wireless device from the first communication system to the second communication system. For example, wireless device 302 can be handed over from first communication system 312 to second communication system 310. For example, to address network congestion, load balancing, or carrier band management, when wireless device 302 detects second communication system 310 the wireless device may notify first communication system 312 by sending a message to first communication system 312. As another example, it can be determined that wireless device 302 is leaving a coverage area of first communication system 312 and is entering a coverage area of second communication system 310. In such cases, a handover can be performed for wireless device 302 from first communication system 312 to second communication system 310.

In operation 410, the second communication system communicates with the wireless device. For example, second communication system 310 can communicate with wireless device 302 through access node 306. In operation 412, wireless device 302 provides an access node location to first communication system 312 via second communication system 310 indicating an access node location of second communication system 310. For example, when wireless device 302 communicates with second communication system 310 via access node 306, wireless device 302 can provide a location of access node 306 to first communication system 312. The access node location can be, for example, a network address (such as an IP address) or other information permitting the addressing of information to the access node. The access node location can be provided, for example, to controller node 314, or to another network element of first communication system 312.

In operation 414, using the access node location, the first communication system sends a paging message to the wireless device via the second communication system. For example, information such as data, a call request, and the like, can arrive at first communication system 312 for wireless device 302. First communication system can send a paging message to notify wireless device 310 about the arrived information via second communication system 310. In an embodiment, using the access node location, first communication system 312 can send a paging message to access node 306 for delivery to wireless device 302. In an embodiment, first communication system 312 may be unable to send a paging message directly to wireless device 302 over a paging system of first communication system because, for example, first communication system does not maintain a communication link with wireless device 302 when wireless device 302 is handed over to second communication system 310. First communication system 310 can provide a paging message to wireless device 302 via second communication system 312 using, for example, the access node location.

In an embodiment, an access node location of a plurality of access nodes of the second communication system can be provided to the first communication system. For example, in addition to an access node location for access node 306, access node locations can be provided for additional access nodes of second communication system 310. The additional access nodes can be, for example, access nodes which provide communications to areas which are adjacent or proximate to access node 306. The additional access nodes can also be access nodes of a subnetwork or other logical grouping within second communication system 310, which could be access nodes of a particular building, campus, or organization. The additional access nodes can also be access nodes of a designated service provider such as, for example, a designated "hot spot" or access node which provides branded access nodes, network access service, and the like. In an embodiment, the paging message can be sent to access node 306 and at least one of the plurality of additional access nodes of second communication system 310 to reach wireless device 302.

In operation 416, the first communication network is detected. For example, wireless device 302, while in communication with second communication system 310 via access node 306, can detect first communication system 312. In an embodiment, wireless device 302 can detect access node 308. In such case, wireless device 302 can send a request for the performance of a handover to first communication system 312. The handover request can be sent via second communication system 310. The request for handover can also be sent to access node 308. In an embodiment, access node 308 of first communication system 312 can detect wireless device 302, and first communication system can request or instruct that wireless device 302 be handed over to access node 308.

In operation 418, the network information stored on the wireless device is received. For example, the network information stored on wireless device 302 can be received by first communication system 312 via second communication system 310, and/or via access node 308. In operation 420, a handover is performed of wireless device 302 to access node 308 using the network information which was stored on wireless device 302. Thereafter, wireless device 302 can communicate with first communication system 312 via access node 308.

Figure 5:
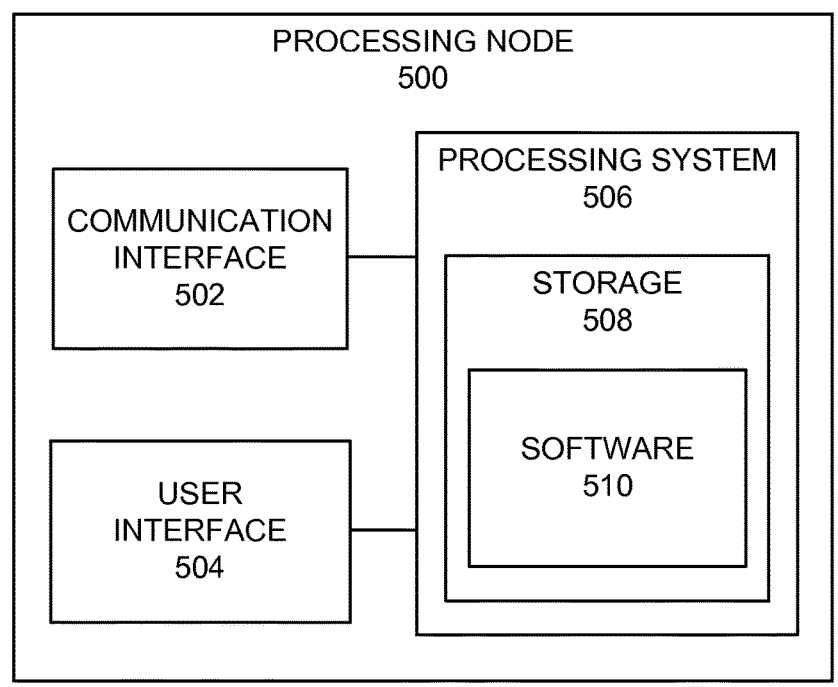
FIG. 5 illustrates an exemplary processing node.

FIG. 5 illustrates an exemplary processing node 500 comprising communication interface 502, user interface 504, and processing system 506 in communication with communication interface 502 and user interface 504. Processing system 506 includes storage 508, which can comprise a disk drive, flash drive, memory circuitry, or other memory device. Storage 508 can store software 510 which is used in the operation of processing node 500. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

An example of processing node 500 include controller node 314. Processing node 500 can also be an adjunct or component of another network element, and can also be another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of communicating with a wireless device, comprising:

receiving a location of a first access node of a first system at a network element of a second system from a wireless device connected to the first system via the first access node using a first radio access technology (RAT), the network element of the second system operating a second RAT different from the first RAT;

wherein the first RAT of the first system is based on a IEEE 802 wireless communication protocol;

receiving a message for the wireless device at the second system;

determining, based on the location of the first access node, locations of a plurality of second access nodes of the first system, the plurality of second access node locations being proximate to the location of the first access node; and paging the wireless device from the network element of the second system via the first access node and at least one of the plurality of second access nodes based on the received location of the first access node and the determined location of the at least one second access node;

wherein prior to receiving the location of the first access node location at the network element of the second system, the method further comprises:

performing a handover of the wireless device from the second system to the first system;

wherein prior to performing the handover of the wireless device from the second system to the first system, the method further comprises:

detecting the first system by a wireless device connected to the second communication system.

2. A system for communicating with a wireless device, the system comprising:

a processing node configured to:

receive a location of a first access node of a first system at a network element of a second system from a wireless device connected to the first system via the first access node using a first radio access technology (RAT), the network element of the second system operating a second RAT different from the first RAT;

wherein the first RAT of the first system is based on a IEEE 802 wireless communication protocol;

receive a message for the wireless device at the second system: determine, based on the location of the first access node, locations of a plurality of second access nodes of the first system, the plurality of second access node locations being proximate to the location of the first access node: and paging the wireless device from the network element of the second system via the first access node and at least one of the plurality of second access nodes based on the received location of the first access node and the determined location of the at least one second access node;

wherein prior to receiving the location of the first access node at location the network element of the second system, the processing node is configured to:

perform a handover of the wireless device from the second system to the first system;

wherein prior to performing the handover of the wireless device from the second system to the first system, the processing node is configured to:

detect the first system by a wireless device connected to the second system.

* * * * *